Jan. 8, 1952 E. T. MORTON ET AL 2,581,692
FASTENING DEVICE
Filed Nov. 29, 1946 2 SHEETS—SHEET 1
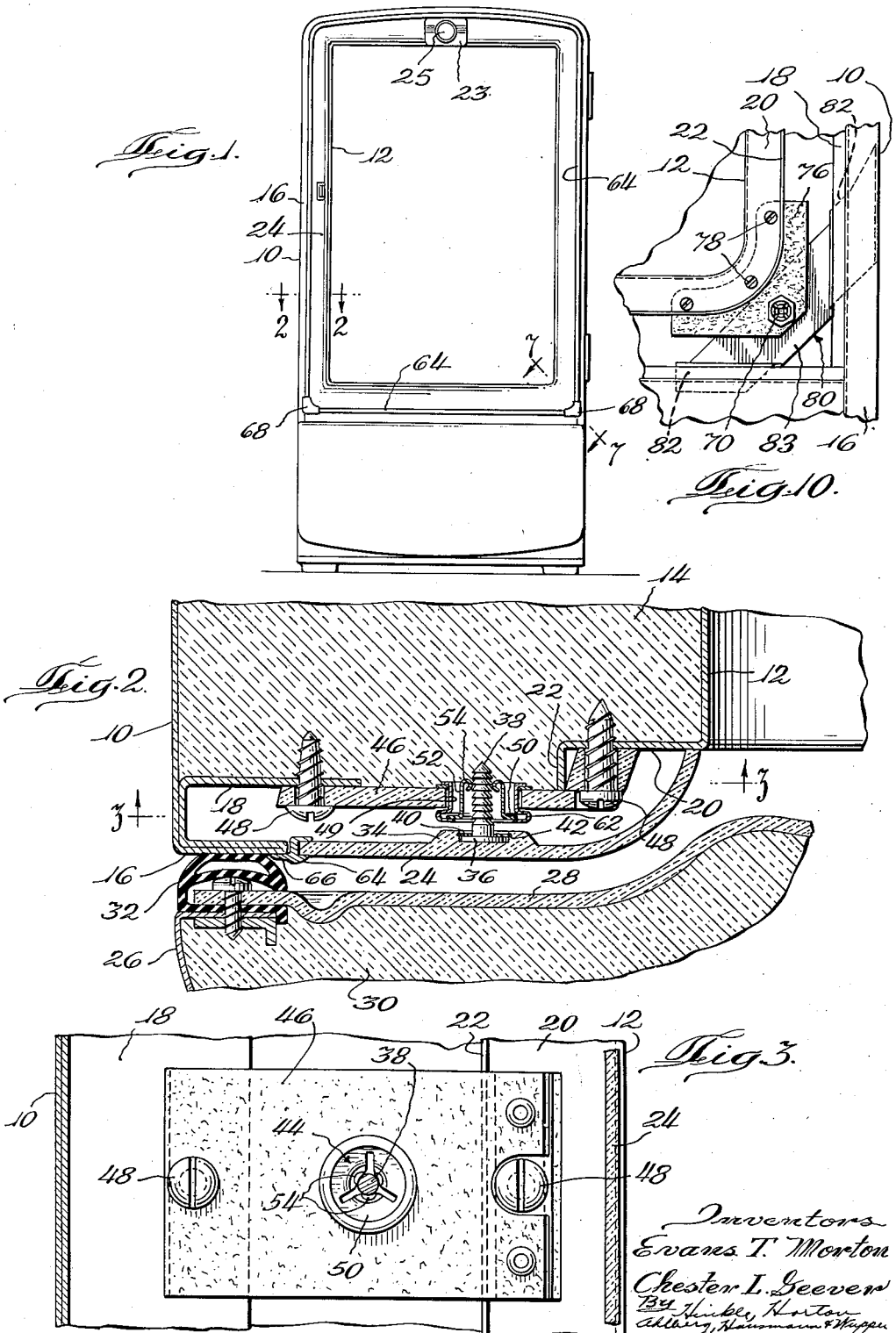
Inventors
Evans T. Morton
Chester L. Geever
By Hibben, Horton,
Ahlberg, Hausmann & Wegner
Attorneys Jan. 8, 1952 E. T. MORTON ET AL 2,581,692
FASTENING DEVICE
Filed Nov. 29, 1946 2 SHEETS—SHEET 2
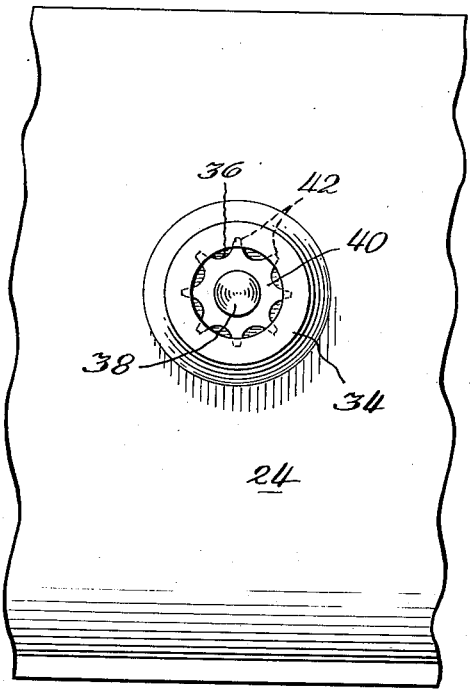
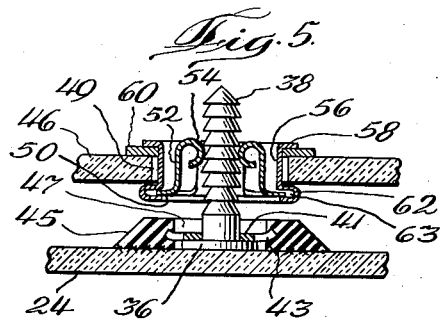
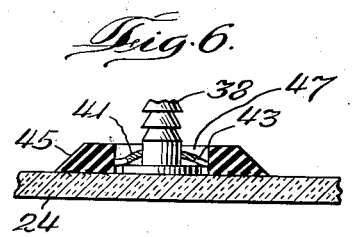
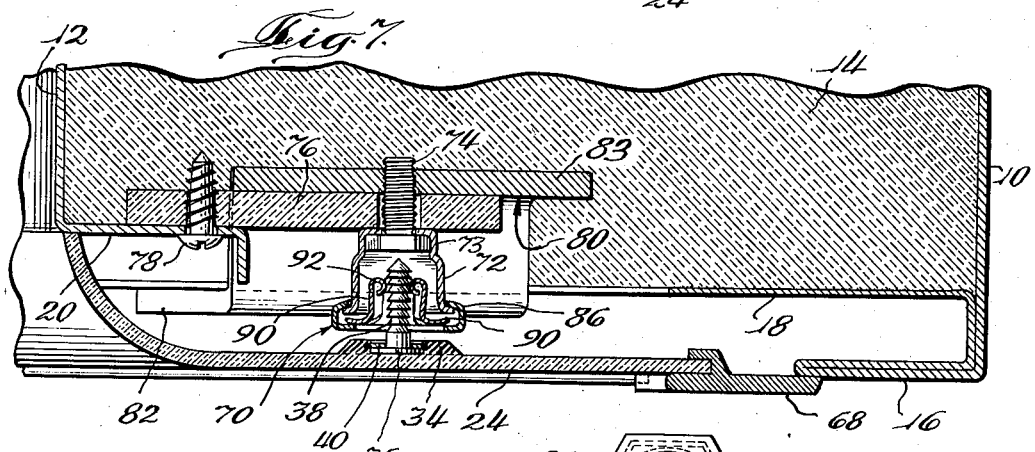
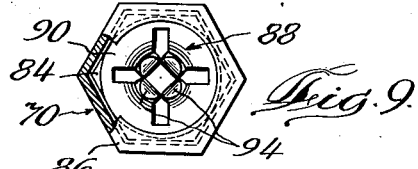
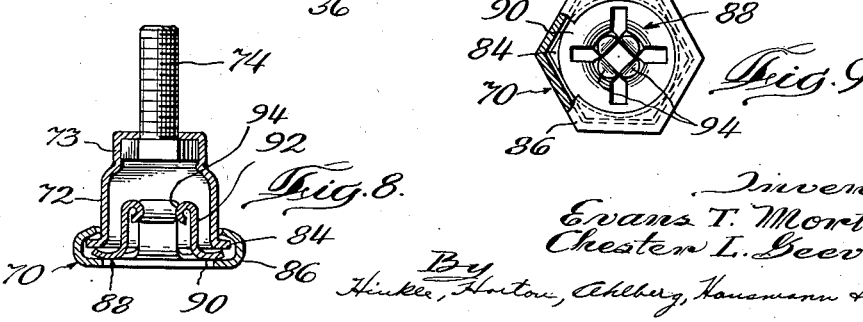
Inventors
Evans T. Morton
Chester L. Geever
By Hinkle, Horton, Ahlberg, Hausmann & Hupper
Attorneys Patented Jan. 8, 1952

2,581,692

UNITED STATES PATENT OFFICE 2,581,692

FASTENING DEVICE

Evans T. Morton and Chester L. Geever, Chicago, Ill., assignors to Admiral Corporation, Chicago, Ill., a corporation of Delaware Application November 29, 1946, Serial No. 713,042

4 Claims. (Cl. 220—9)

This invention relates to fastening devices particularly designed for securing together the parts of a cabinet structure in such a way that the fasteners themselves will be wholly concealed when the parts are assembled.

One object of the invention is to provide fastening means for connecting two elements of a relatively rigid structure in situations where it may be difficult to locate the fasteners with extreme accuracy in one or the other of the elements, and to provide securing means for certain parts of the fastening devices which allow them a limited range of movement for accommodating themselves to the locations of the cooperating fastener parts.

Another object of the invention is to provide fastening means of the stud and socket type in which the socket part is mounted with a limited range of movement transversely of its axis in a carrier or holding member which is attached to the structural part with which the fastener is associated, whereby the socket is able to accommodate itself to the position of a cooperating stud.

A further and more specific object of the invention is to provide a novel fastening means of the stud and socket type for securing a trim and breaker strip to the front of a refrigerator cabinet so that not only is the gap between the food compartment liner and the outer shell concealed by the breaker strip but also the fastening means.

Other objects and advantages of the invention will be more clearly and fully understood from the following description taken in connection with the drawings, in which:

Fig. 1 is a front elevational view of a refrigerator cabinet with the door removed and including a trim and thermal breaker member adapted to be held in place by fastening devices embodying this invention;

Fig. 2 is a horizontal detail sectional view taken as indicated at line 2—2 on Fig. 1 and on a much larger scale;

Fig. 3 is a detail section taken as indicated at line 3—3 on Fig. 2;

Fig. 4 is a detail elevational view showing a fragment of the breaker strip and the stud member of the fastener of Fig. 2 attached thereto;

Fig. 5 is an axial sectional view of a modification of the means for attaching a stud member to the trim and breaker member including in section a cooperating socket and associated structure;

Fig. 6 is a fragmentary sectional view taken at the same plane as Fig. 5 but showing the securing means for the stud as it appears prior to final securement;

Fig. 7 is a detail section taken as indicated at line 7—7 on Fig. 1, showing a slightly modified form of fastener as compared with that illustrated in Fig. 2;

Fig. 8 is an axial detail sectional view of the socket member of the fastener shown in Fig. 7;

Fig. 9 is a face view of the socket shown in Fig. 8 with parts broken away and shown in section; and Fig. 10 is a fragmentary front elevation showing the structure at a corner of the cabinet, with the breaker strip omitted.

This invention has been developed particularly with a view to providing fastening devices to be used in assembling certain parts of a refrigerator cabinet. A cabinet of the type shown in Fig. 1 includes a metallic outer wall seen at 10 in Fig. 2, and a metallic inner wall as food compartment liner 12 with a filling of heat insulating material 14 between said walls. As shown, the wall 10 has its front edge doubled back upon itself to form an external flange 16 and an internal flange 18 spaced back from the flange 16 in a plane parallel thereto, the flanges 16 and 18 being substantially perpendicular to the wall 10. The front edge of the wall 12 is bent at right angles to form a flange 20 which has a terminal portion 22 bent to extend forwardly from the part 20 and substantially to the plane of the flange 18. Said flanges 22 and 18 are separated by a very substantial gap to prevent the transmission of heat from the outer wall 10 to the inner wall 12 of the refrigerator, and to cover this gap it is usual to provide a trim member commonly termed a "breaker strip" because it breaks the thermal connection between the inner and outer walls.

In the structure illustrated, the breaker strip is in the form of a continuous rectangular frame 24 preferably molded of thermosetting plastic material, but it may be understood that this member might be composed of four separate strips or of a larger number of sections if desired. It is, therefore, referred to hereinafter as a "trim strip," and the problem of the present invention is to provide means for conveniently mounting the element 24 in position to bridge the gap between the inner and outer walls of the refrigerator cabinet. One desirable feature of the fastening means to be employed for this purpose is that it shall be invisible when the breaker or trim strip 24 is in place so that the latter shall present a smooth and unbroken ornamental surface which will add to the neatness and attractiveness of the cabinet and at the same time present an area which can easily be kept in a clean and sanitary condition. In Fig. 1 an ornamental escutcheon plane 23 for a thermostat control knob 25 is shown applied to the upper portion of the breaker member 24. Fig. 2 includes a fragment of the refrigerator door which covers the trim or breaker strip 24 and conceals it whenever the door is closed. As shown, the door includes an outer shell 26 and an inner panel 28 formed of a material having low heat conductivity with heat insulating material 30 filling the space between them and with a rubber sealing gasket 32 interposed between the marginal portion of the door and the flange 16 of the cabinet.

To provide securement for the fastening elements of this invention, the breaker strip or frame 24 has molded on its rear face a plurality of circular bosses 34 spaced at convenient intervals and each having a central recess in which there is lodged the head 36 of a stud part 38 of the fastener. The head is permanently anchored in the recess of the boss 34 by means of a washer 40 which is initially of convex form and which has peripherally disposed prongs 42 so that when the washer is flattened against the head 36 the prongs 42 are driven outward into engagement with the material of the boss 34, as seen in Fig. 4.

The cooperating element of the fastener is in the nature of a socket 44 which is carried by a block 46 of fibrous or other material of relatively low thermal conductivity which connects the liner 12 to the outer shell 10, and is attached to the flanges 18 and 20 by means of self-threading screws 48 as seen in Fig. 2. The socket member 44 of the fastener is shown in Fig. 2 as comprising a substantially flat annular portion 50 and a plurality of spring arms 52 extending from the inner rim of the annular member 50 and substantially at right angles thereto and terminating in curled end portions 54 which embrace and engage the stud 38. The stud has a shank formed with circumferential grooves with which the terminals 54 of the spring arms 52 interlock, and preferably each of these grooves is formed of one abrupt wall substantially perpendicular to the axis of the stud and with one inclined wall oblique to the axis, so that the grooves present the appearance of ratchet teeth, as seen in Fig. 2. This permits the stud to be easily entered between the rounded terminals 54 of the spring arms 52 while the abrupt or perpendicular shoulders formed by the grooves strongly resist withdrawal of the stud, thus insuring that the trim or breaker strip 24 when once installed in the cabinet will be held firmly in place, although when necessary it may be removed with the application of sufficient force to withdraw the studs 38 from their respective sockets.

In Fig. 2 the boss 34 is shown to be an integral part of the trim strip 24 and of the same material. It may be desirable to make the bosses of a material which has an inherent resiliency so that when the strip 24 is removed the strains imposed upon the stud mounting by an angular application of force will not be greatly localized but will be more evenly distributed which minimizes the danger of breaking the boss on the strip. Fig. 4 illustrates a boss 45 formed of a flexible and elastic material in the nature of a synthetic rubber composition; the boss 45 can be molded onto the trim strip 24 when the strip is being molded, so that in effect the resilient boss becomes integral with the strip 24. Although the head 36 of the stud 38 is then firmly held in the recess of the boss 45, the more elastic material of the latter serves to absorb or distribute any strain without danger of breaking and releasing the head 36 of the stud 38.

Figs. 5 and 6 also illustrate a slightly modified form of anchoring washer 41 for holding the stud in the boss 45. When the boss is of resilient material it is desirable to have the prongs of the washer somewhat longer than they would be if the boss were of relatively rigid material like the breaker strip 24. Fig. 5 shows the washer 41 with comparatively long prongs 43, and Fig. 6 shows this washer in its initial convex shape in which the prongs 43 are disposed within a circle of substantially the size of the recess 47 of the boss 45. When the washer has been thus entered in the recess, pressure is applied to the central portion of the washer surrounding the shank of the stud 38 so as to flatten the washer at the center, thus causing the prongs to be forced radially outward into the material of the boss 45.

Preferably the prongs are initially formed so that in their final position as shown in Fig. 5 they are curved slightly upward, that is, away from the plane of the strip 24. The resulting cupped contour of the washer 41 considered as a whole, and the upwardly-bent formation of the individual prongs 43, make it substantially impossible for the prongs to be pulled out of the washer by any angular strain to which the stud might be subjected during its disengagement from its cooperating socket 44; and this shape of the washer also improves the holding strength of the stud 38 against a direct axial pull.

In the form shown in Figs. 2 and 5, the socket element 44 is mounted for limited movement transversely of its axis. The mounting consists of a cylindrical or tubular body 56 disposed in an opening 49 in the mounting block 46 and having a flange 58 which is bent over a washer 60 engaging the rear face of the block 46. The opposite end of the body 56 is also provided with a flange 62 which overlaps the forward face of the block 46. Preferably the opening 49 in the block 46 is somewhat larger than the tubular portion 56 of the mounting member and the flanges 58 and 62 engage the block somewhat loosely so as to permit bodily movement of the mounting member transversely of its axis to the extent of the clearance of its tubular portion 56 in the opening 49. The flange 62 of the mounting member is doubled over to form an annular channel 63 in which the flat annular portion 50 of the socket element is loosely engaged; but the outer diameter of said part 50 is considerably less than the diameter of the channel 63 in the flange 62, thus allowing the member 44 a limited movement transversely of its axis and within the channel. This play of the socket member 44 within the mounting element 56 and the play of the latter within the opening 49 in the block 46 provide the socket with substantial capacity for accommodating itself to the particular location of the cooperating stud 38 in the part 24, and permit considerable tolerance in the location of the studs and also in the mounting of the blocks 46 on the flanges of the walls 10 and 12. Thus when the socket members have been properly located in the cabinet structure by the installation of the blocks 46 at suitable intervals the installation of the rectangular breaker strip or trim element 24 is reduced to the simple matter of placing this member in position for initial registration of each of its studs 38 with a corresponding socket 44 and then simply pushing the member 24 into place until the edge of its rounded inner margin engages the flange 20 of the wall 12. As shown, the opposite edge of the part 24 is fitted with a metal bead 64 in the form of a channel which embraces the outer edges of the part 24 and which has an outwardly-extending lip or flange 66 which engages the outer face of the flange 16 of the wall 10. Preferably, the bead 64 includes a separate section extending across the bottom edge of the part 24 and the joints in the bead at the lower corners of the part 24 are overlapped by corner fittings 68. It may be understood that the bead sections 64 and the corner fittings 68 will be applied to the rectangular breaker strip 24 and secured thereto before the strip is installed in the cabinet structure.

While the socket elements of the fastener are especially constructed to accommodate themselves to slight irregularities in the location of the studs or the sockets, it is desirable to locate the breaker member 24 quite definitely as a unit with respect to the cabinet structure; therefore the socket members which receive the corner portions of the rectangular member 24 do not provide for quite as much accommodation as the other sockets. Fig. 7 shows one of these socket members 70 as comprising a cup-shaped body 72 having a threaded stud 74 extending from its bottom wall through a mounting block 76 which is attached by a screw 78 to the flange portion 20 of the inner wall 12.

A metallic bar 80 is secured diagonally across the corner of the cabinet structure, having offset end portions 82 attached to flanges of the outer walls of the food compartment, as seen in Fig. 10. The middle portion 83 of this bar is threaded to receive the stud 74 with the block 76 clamped between the bar 80 and the bottom of the cup-shaped body 72. The socket unit 70 is thus firmly anchored in position by the parts 76 and 80. The material of the block 76 is like that of the blocks 46, a fibrous material of low thermal conductivity, so that it serves to position the liner in the shell without impairing the insulation of the inner wall from the outer wall of the refrigerator cabinet.

At its outer end the cup 72 is formed with a hexagonal flange 84, and a hexagonal inwardly open channel member 86 is fitted around said flange, as seen in Fig. 8. The base 73 of the cup 72 is of hexagonal form, closely embracing the hexagonal head of the stud 74, so that when a wrench or similar tool is applied to the hexagonal part 86 the stud 74 can be screwed into the threaded hole in the bar 80. The socket member proper designated by the numeral 88 includes an annular portion 90 which fits loosely in the channel 86. Spring arms 92 extend from the inner rim of the annular member 90 and are formed with curved terminals 94 for engagement with the grooved shank of the stud 38 as shown in Fig. 7. The annular part 90 is so dimensioned as to have clearance within the channel 86, which permits some movement of the socket element 88 transversely of its axis within the supporting cup 72, and this relatively limited play of the socket member 88 in its supporting cup 72 insures reasonably accurate location of the corners of the part 24 in the cabinet structure.

While there is shown and described herein certain structures embodying the invention and illustrative thereof, it is to be understood that the invention is not limited thereto or thereby, but that it embraces all modifications, variations and equivalents which may come within the scope of the appended claims. What is claimed as new and desired to be secured by United States Letters Patent is:

1. Fastening means for securing a trim strip in place in a cabinet structure, said means comprising a stud part and a socket part, means for mounting the stud part on the trim strip, said socket part including a mounting member having a tubular body portion, the cabinet structure including a mounting block having an opening through which said tubular body portion extends with clearance for movement in all directions transversely of its axis, said body having end flanges embracing said mounting block to retain the socket part in place, one of said end flanges being in the form of an annular channel open toward the axis of its annular form, and said socket part including an annular member loosely engaged in said channel with clearance for movement in all directions transversely of its axis, and means carried by said annular member to engage and hold said stud.

2. Fastening means for securing a trim strip in place in a cabinet structure, said means comprising a socket part and a stud part having a relatively long shank provided with generally circumferential ridges over the major portion of its length, means for mounting said stud part on the trim strip, said socket part including an annular member with spring arms extending from its inner rim, said stud shank removably extending through said annular member so that said spring arms embrace said stud shank and engage between adjacent ridges, the cabinet structure including a mounting block having an opening therethrough, and said socket part including a mounting member formed for attachment to said block, said mounting member having a tubular portion extending through said block opening with clearance for movement in said opening in all directions transversely of its axis and having end flanges embracing said mounting block to retain said socket part in place, one of said flanges comprising an annular channel open toward the axis of its annular form and in which the outer marginal portion of said annular member is loosely engaged with clearance for movement in all directions transversely of its axis.

3. In a refrigerator cabinet having an outer metallic shell and an inner food compartment defining metallic liner spaced therefrom, a plurality of blocks of low thermal conductivity connected to and bridging between said shell and said liner at the front edges thereof and at least partially supporting said liner from said shell, a generally centrally located aperture in each of said blocks, a thermal breaker strip closing the space between said shell and said liner and covering said blocks, and a plurality of fastening devices securing said breaker strip to said blocks, each of said fastening devices comprising a stud part and a socket part adapted to receive and retain said stud part, means securing said stud part to said breaker strip, said socket part including a mounting member having a tubular body portion extending through the aperture in one of said blocks with clearance for movement in all directions transversely of its axis, said tubular body portion having end flanges embracing said one mounting block to retain said socket part in place, one of said end flanges being in the form of an annular channel open toward the axis of its annular form, and said socket part including an annular member loosely engaged in said annular channel for movement therein in all directions transversely of its axis, and means carried by said annular member to engage and hold said stud part.

4. In a refrigerator cabinet having an outer metallic shell and an inner food compartment defining metallic liner spaced therefrom, a plurality of blocks of low thermal conductivity connected to and bridging between said shell and said liner at the front edges thereof and at least partially supporting said liner from said shell, a generally centrally located aperture in each of said blocks, a thermal breaker strip closing the space between said shell and said liner and covering said blocks, and a plurality of fastening devices securing said breaker strip to said blocks, each of said fastening devices comprising a socket part and a stud part having a relatively long shank provided with generally circumferential ridges over the major portion of its length, means for mounting said stud part on said breaker strip, said socket part including an annular member with spring arms extending from its inner rim, said stud shank removably extending through said annular member so that said spring arms embrace said stud shank and engage between adjacent ridges, and a mounting member formed for attachment to one of said blocks, said mounting member having a tubular portion extending through said block aperture with clearance for movement in said aperture in all directions transversely of its axis and having end flanges embracing said mounting block to retain said socket part in place, one of said flanges comprising an annular channel open toward the axis of its annular form and in which the outer marginal portion of said annular member is loosely engaged with clearance for movement in all directions transversely of its axis.

EVANS T. MORTON.
CHESTER L. GEEVER.

REFERENCES CITED

The following references are of record in the file of this patent:

UNITED STATES PATENTS

| Number | Name | Date |
|---|---|---|
| 1,760,262 | Walters | May 27, 1930 |
| 1,850,622 | Fenton | Mar. 22, 1932 |
| 1,873,870 | Carr | Aug. 23, 1932 |
| 2,259,186 | Swedman | Oct. 14, 1941 |
| 2,266,893 | Nauert | Dec. 23, 1941 |
| 2,284,301 | Rieser | May 26, 1942 |
| 2,329,752 | Goulooze | Sept. 21, 1943 |
| 2,349,419 | Goulooze | May 23, 1944 |
| 2,367,886 | Nauert | Jan. 23, 1945 |